United States Patent
Goodman

(10) Patent No.: US 11,267,687 B2
(45) Date of Patent: Mar. 8, 2022

(54) AUTOMATIC ANIMAL WATERING ASSEMBLY

(71) Applicant: Michael Goodman, Lafayette, IN (US)

(72) Inventor: Michael Goodman, Lafayette, IN (US)

( * ) Notice: Subject to any disclaimer, the term of this patent is extended or adjusted under 35 U.S.C. 154(b) by 291 days.

(21) Appl. No.: 16/711,034

(22) Filed: Dec. 11, 2019

(65) Prior Publication Data

US 2021/0179413 A1 Jun. 17, 2021

(51) Int. Cl.
*B67D 3/00* (2006.01)
*A01K 7/02* (2006.01)
*B67D 3/02* (2006.01)
*B67D 3/04* (2006.01)

(52) U.S. Cl.
CPC ............ *B67D 3/0003* (2013.01); *A01K 7/025* (2013.01); *B67D 3/0032* (2013.01); *B67D 3/02* (2013.01); *B67D 3/043* (2013.01)

(58) Field of Classification Search
CPC ...... B67D 3/0032; B67D 3/0003; B67D 3/02; B67D 3/043; A01K 7/02–06; A01K 7/025
See application file for complete search history.

(56) References Cited

U.S. PATENT DOCUMENTS

| | | | |
|---|---|---|---|
| 443,228 A * | 12/1890 | Rose | A01K 7/06 119/75 |
| 662,990 A * | 12/1900 | Thornburgh | A01K 39/026 119/77 |
| 1,310,320 A * | 7/1919 | Bogda | A01K 7/06 119/75 |
| 1,330,438 A * | 2/1920 | Ferris | A01K 7/06 119/75 |
| 3,477,408 A * | 11/1969 | Mull | A01K 7/04 119/78 |
| 3,555,848 A * | 1/1971 | Johnson | F25D 11/00 62/457.9 |
| 6,079,361 A * | 6/2000 | Bowell | A01K 7/02 119/52.1 |
| 6,835,307 B2 | 12/2004 | Talbert | |
| 7,380,518 B2 | 6/2008 | Kates | |
| 8,117,991 B1 * | 2/2012 | Civitillo | A01K 7/02 119/73 |
| 8,146,535 B1 * | 4/2012 | Neumann | A01K 7/027 119/73 |
| D682,484 S | 5/2013 | Selman | |
| 2004/0118356 A1* | 6/2004 | Krishnamurthy | A01K 7/025 119/74 |
| 2007/0277738 A1* | 12/2007 | Dentsbier | A01K 7/02 119/77 |
| 2010/0269341 A1 | 10/2010 | Stewart | |

* cited by examiner

*Primary Examiner* — Andrew D StClair

(57) ABSTRACT

An automatic animal watering assembly includes a base that has a bowl section therein and a receiver section. A container is removably inserted into the receiver section of the base. The container contains water and the container releases the water into the bowl section. The container has an opening extending through a top end of the container for filling the container. A plug is movably positioned within the container. The plug is positionable in a closed position and an open position. A lid is hingedly coupled to the top end of the container. A lever is pivotally coupled to the container and the plug rests on the lever. The lever lifts the plug when the lever is lifted and the lever lowers the plug when the lever is lowered. The lever is in mechanical communication with the lid such that the lid lowers and lifts the lever.

17 Claims, 4 Drawing Sheets

AUTOMATIC ANIMAL WATERING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to watering devices and more particularly pertains to a new watering device for automatically dispensing water for an animal to drink.

BRIEF SUMMARY OF THE INVENTION

An embodiment of the disclosure meets the needs presented above by generally comprising a base that has a bowl section therein and a receiver section. A container is removably inserted into the receiver section of the base. The container contains water and the container releases the water into the bowl section. The container has an opening extending through a top end of the container for filling the container. A plug is movably positioned within the container. The plug is positionable in a closed position and an open position. A lid is removably coupled to the top end of the container. A lever is pivotally coupled to the container and the plug rests on the lever. The lever lifts the plug when the lever is lifted and the lever lowers the plug when the lever is lowered.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
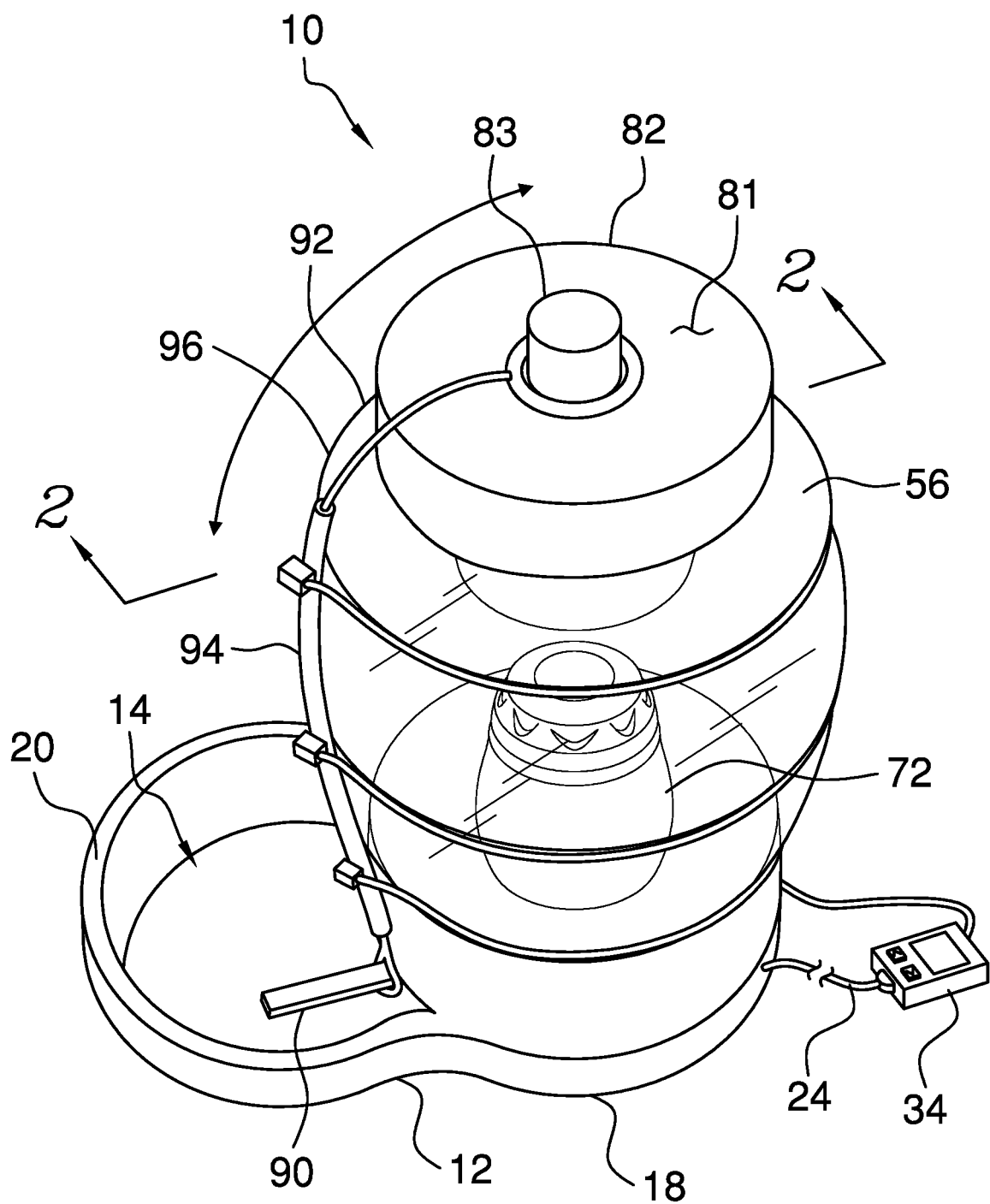
FIG. 1 is a top perspective view of an automatic animal watering assembly according to an embodiment of the disclosure.
Figure 2:
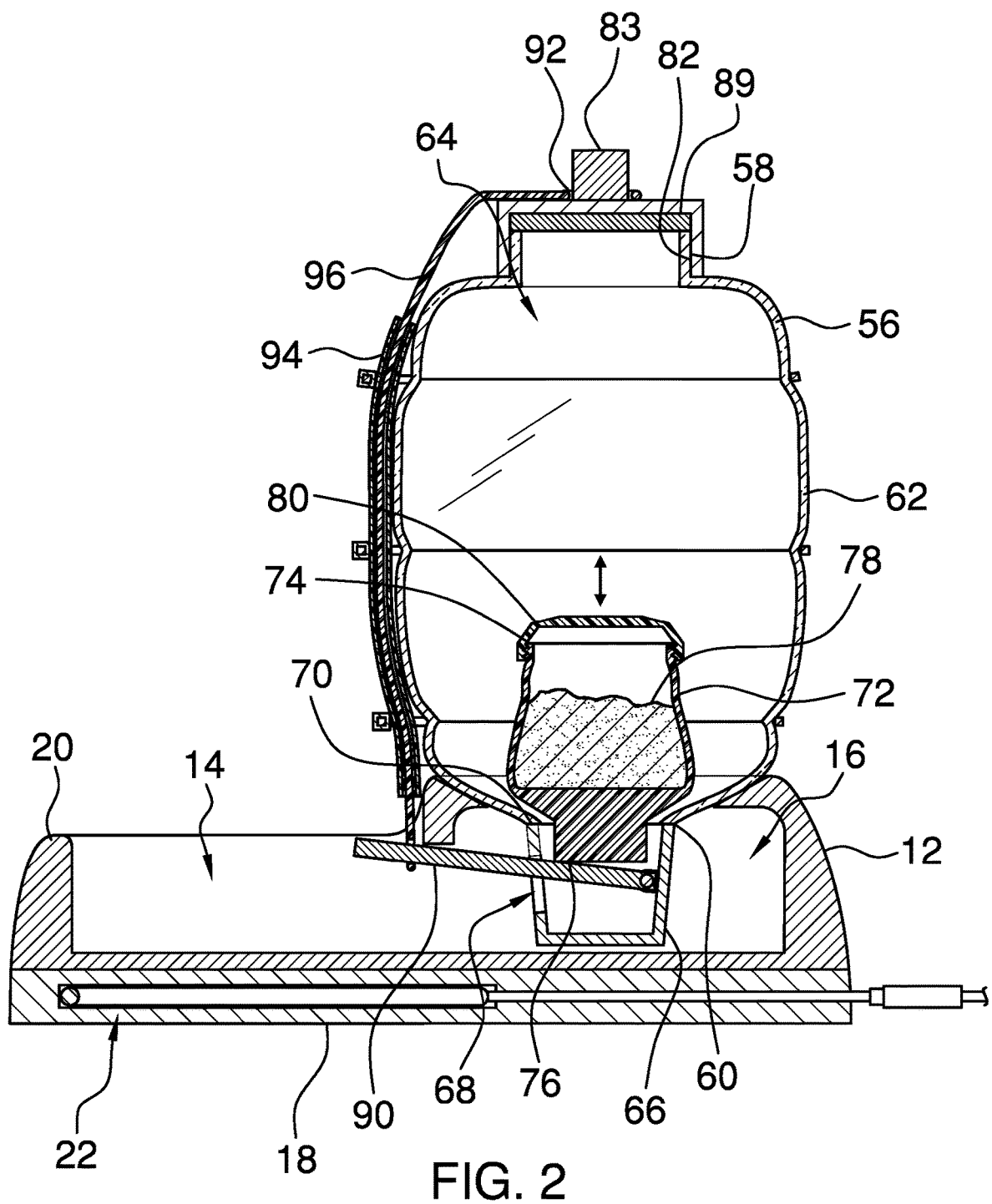
FIG. 2 is a cross sectional view taken along line 2-2 of FIG. 1 of an embodiment of the disclosure showing a lid in a closed position and a plug in an open position.
Figure 3:
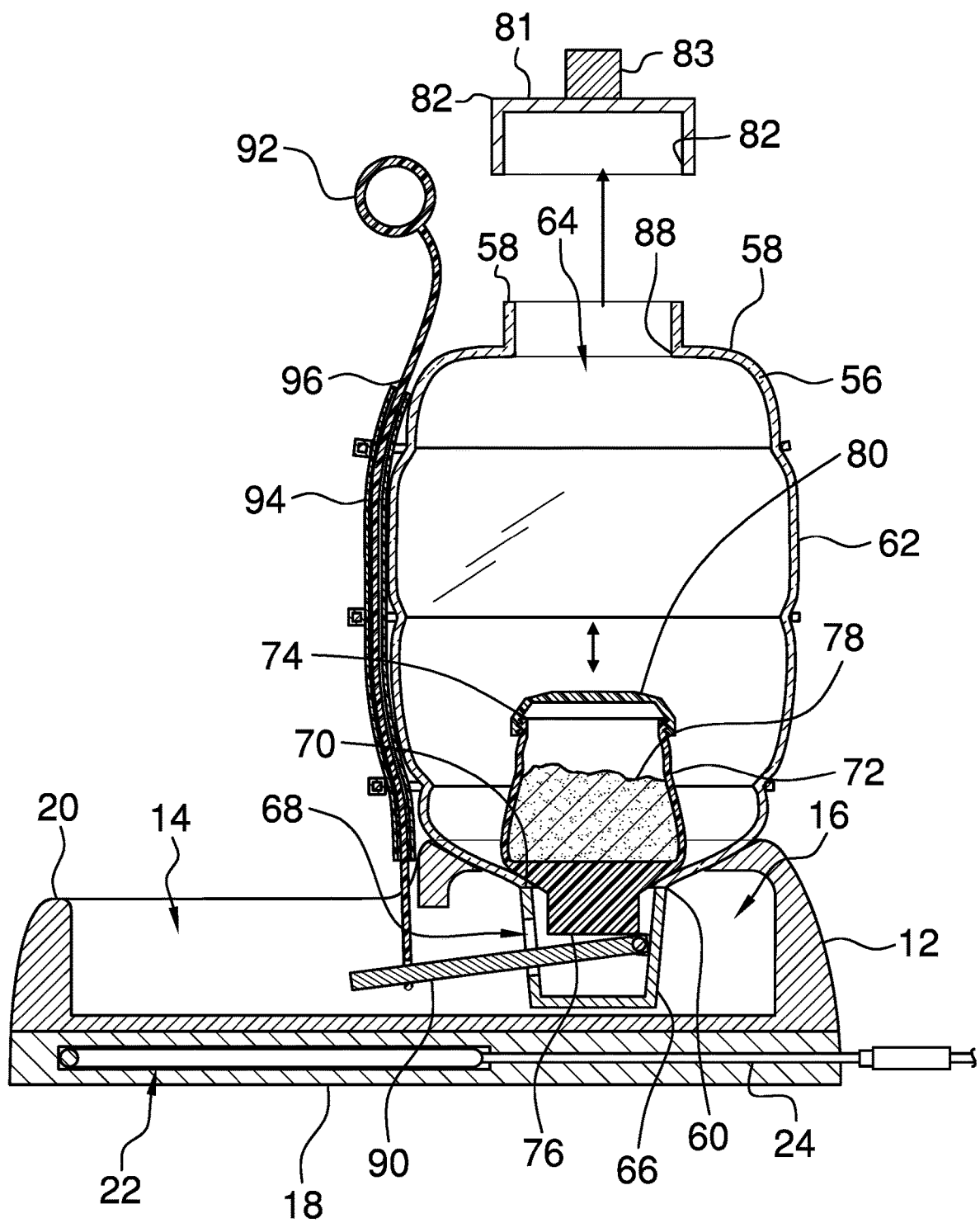
FIG. 3 is a cross sectional view taken along line 2-2 of FIG. 1 of an embodiment of the disclosure showing a lid in an open position and a plug in a closed position.
Figure 4:
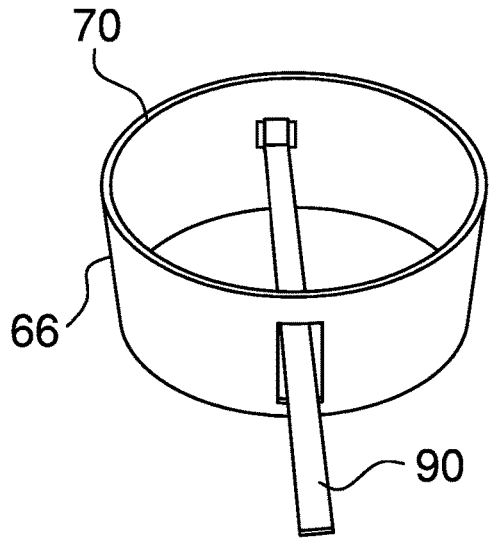
FIG. 4 is a top perspective view of a funnel of an embodiment of the disclosure.
Figure 5:
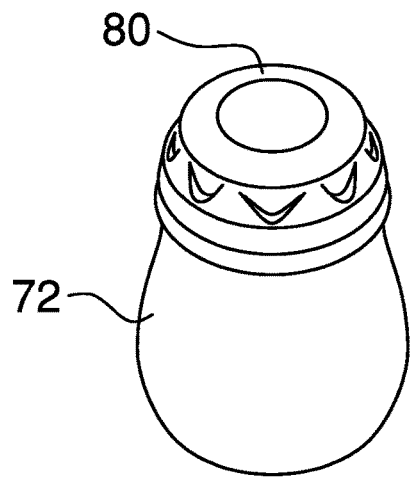
FIG. 5 is a perspective view of a plug of an embodiment of the disclosure.
Figure 6:
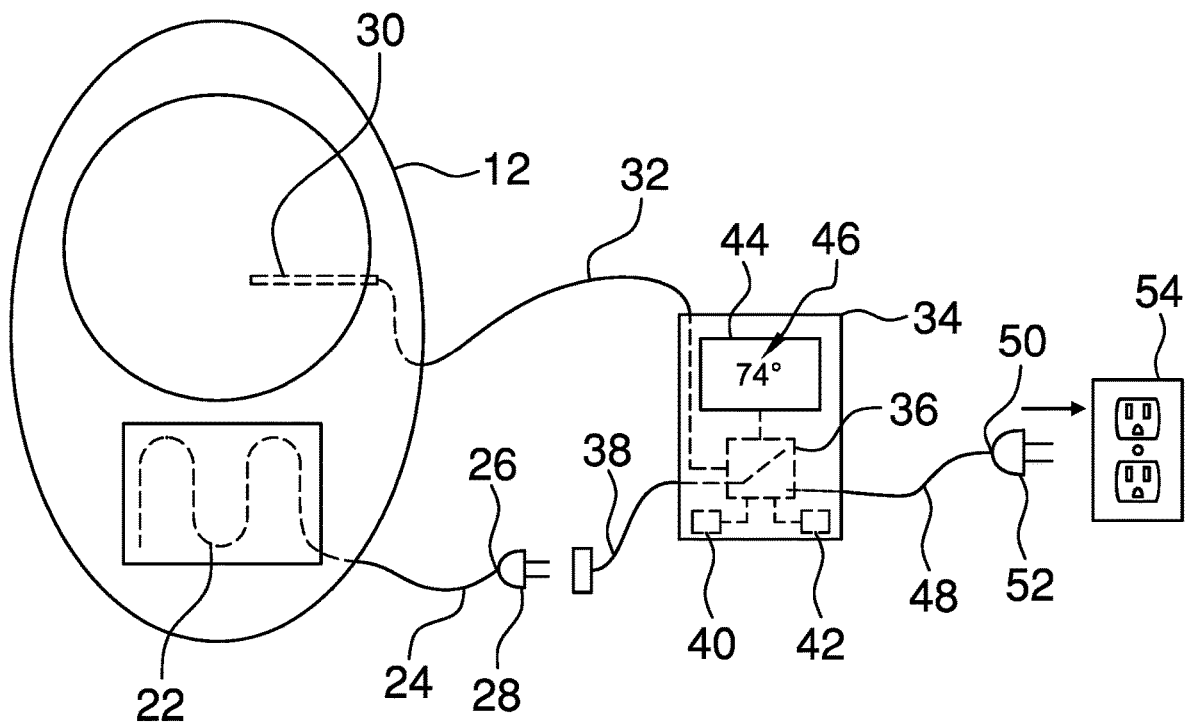
FIG. 6 is a perspective view of base and a heating unit of an embodiment of the disclosure.

With reference now to the drawings, and in particular to FIGS. 1 through 6 thereof, a new watering device embodying the principles and concepts of an embodiment of the disclosure and generally designated by the reference numeral 10 will be described.

As best illustrated in FIGS. 1 through 6, the automatic animal watering assembly 10 generally comprises a base 12 that has a bowl section 14 therein and a receiver section 16 therein. The bowl section 14 is in fluid communication with the receiver section 16. The base 12 has a bottom wall 18 and a top wall 20, and each of the bowl section 14 and the receiver section 16 extends downwardly in the top wall 20 toward the bottom wall 18. Additionally, top wall has a plurality of engagements 21 thereon and each of the engagements is aligned with the receiver section 16.

A heating unit 22 is coupled to the base 12 and the heating unit 22 is in thermal communication with the bowl section 14. In this way the heating unit 22 heats the bowl section 14 when the heating unit 22 is turned on thereby heating water contained in the bowl section 14. Additionally, the heating unit 22 is integrated into the bottom wall 18 of the base 12. The heating unit 22 may include, but not be limited to, an electric heating coil, an electric heat plate or any other type of electric heat source with a maximum operational temperature of approximately 80.0 degrees Fahrenheit.

A heating cord 24 is electrically coupled to the heating unit 22 and extending outwardly from the base 12. The heating cord 24 has a distal end 26 with respect to the base 12 and a male plug 28 is electrically coupled to the distal end 26. A temperature sensor 30 is coupled to the base 12 such that the temperature sensor 30 is in thermal communication with the bowl section 14. The temperature sensor 30 may be an electronic thermometer or the like. A temperature cord 32 is electrically coupled to the temperature sensor 30 and extends outwardly from the base 12.

A control unit 34 provided and the control unit 34 is electrically coupled to the heating unit 22 for turning the heating unit 22 on and off. The control unit 34 sets a maximum temperature for the heating unit 22. Additionally, the control unit 34 is electrically coupled to the temperature sensor 30 such that the control unit 34 senses the operational temperature of the heating unit 22. The control unit 34 turns the heating unit 22 off for a pre-determined duration of time when the temperature sensor 30 senses a temperature in excess of the maximum temperature. In this way the control unit 34 inhibits the heating unit 22 from heating the water to a temperature that could pose a burn hazard.

The control unit 34 comprises a control circuit 36 that is positioned within the control unit 34, and the control circuit 36 receives an off input. A heat port 38 is coupled to the control unit 34 and the heat port 38 is electrically coupled to the control circuit 36. The male plug 28 on the heating cord 24 is electrically plugged into the heat port 38 thereby placing the heating unit 22 in electrical communication with the control circuit 36. A down button 40 is movably coupled to the control unit 34 and the down button 40 is electrically coupled to the control circuit 36. The down button 40 decreases the maximum temperature for the heating unit 22. An up button 42 is movably coupled to the control unit 34 and the up button 42 is electrically coupled to the control circuit 36. The up button 42 increases the maximum temperature for the heating unit 22.

A display 44 is coupled to the control unit 34 and the display 44 is electrically coupled to the control circuit 36. The display 44 displays indicia 46 comprising numbers indicating the chosen maximum temperature. The display 44 may comprise an LED or other type of electronic display. A power cord 48 is coupled to and extends away from the control unit 34. The power cord 48 is electrically coupled to the control circuit 36 and the power cord 48 has a distal end 50 with respect to the control unit 34. A male power plug 52 is electrically coupled to the distal end 50 of the power cord 48. The male power plug 52 can be electrically coupled to a power source 54 comprising a female electrical outlet.

A container 56 is provided for containing water. The container 56 is removably inserted into the receiver section 16 of the base 12 to release the water into the bowl section 14. In this way the water can be drank by an animal, such as a dog, a cat or other domesticated animal. The container 56 has a top end 58, a bottom end 60 and an outer wall 62 extending therebetween. The top end 58 has an opening 64 extending into an interior of the container 56 and the water can be poured therethrough for filling the container 56.

The outer wall 62 tapers inwardly at the bottom end 60 thereby defining a funnel 66 that extends into the receiver section 16. An aperture 68 extends into the interior of the container 56 and the aperture 68 is positioned on the funnel 66. In this way the aperture 68 is positioned within the base 12 to release the water into the base 12. Additionally, the funnel 66 has an upper end 70. The outer wall 62 has a plurality of couplers 71 each extending outwardly therefrom and each of the couplers 71 is aligned with the bottom end 60 of the container 56. Each of the couplers 71 engages a respective one of the engagements 21 in the top wall of the base 12 when the container 56 is positioned on the base 12. The container 56 is rotatable into a locking position when the couplers 71 engage the engagements 21 to retain the container 56 on the base 12. The container 56 is rotatable into a releasing position for removing the container 56 from the base 12.

A plug 72 is provided and the plug 72 is movably positioned within the container 56. The plug 72 is positionable in a closed position having the plug 72 being positioned in the upper end 70 of the funnel 66. In this way the plug 72 can inhibit the water from passing through the funnel 66. The plug 72 is positionable in an open position having the plug 72 being displaced from the upper end 70 of the funnel 66. In this way the plug 72 facilitates the water to pass through the funnel 66.

The plug 72 has an upper end 74 and a lower end 76, and the plug 72 is hollow. The upper end 74 of the plug 72 is open and the plug 72 is fillable with a weighted material 78, such as sand or the like, for facilitating the plug 72 to be urged into the closed position. The plug 72 tapers inwardly between the upper end 74 of the plug 72 and the lower end 76 of the plug 72. Thus, the lower end 76 fits within the upper end 68 of the funnel 66 when the plug 72 is in the closed position. A cap 80 is removably coupled to the upper end 74 of the plug 72 for closing the upper end 74 of the plug 72.

A lid 79 is removably coupled to the container 56 and the lid 79 is positioned on the top end 58 of the container 56. The lid 79 closes the opening 64 in the top end 58 when the lid 79 is closed. The lid 79 exposes the opening 64 in the top end 58 when the lid 79 is closed. The lid 79 has a top surface 81 and an inner surface 82, and a stem 83 extends upwardly from the top surface 81. The inner surface 82 is threaded and the inner surface 82 threadably engages the outer wall 62 of the container adjacent to the top end 58 of the container to close the opening 64 in the top end 58. A gasket 89 is positioned between the lid 79 and the container 56 to form a fluid impermeable seal when the lid 79 is closed.

A lever 90 is provided and the lever 90 is pivotally coupled to the container 56. The lever 90 extends into the container 56 and the plug 72 rests on the lever 90. The lever 90 lifts the plug 72 into the open position when the lever 90 is lifted. Conversely, the lever 90 lowers the plug 72 into the closed position when the lever 90 is lowered. The lever 90 extends outwardly through the aperture 68 in the outer wall 62 of the container 56 and into the bowl section of the base 12.

A ring 92 is positionable around the stem 83 on the top surface 81 of the lid 79 and a tube 94 is coupled to the outer wall 62 of the container 56. The tube 94 is vertically oriented on the container 56. Additionally, the tube 94 is positioned to extend substantially between the lid 79 and the lever 90. The tube 94 may be retained on the container 56 with straps, zip ties, or any other releasable fasteners. A member 96 is coupled between the ring 92 and the lever 90, and the member 96 extends through the tube 94. The member 96 may be comprised of a resilient material such that the member 96 does not deform when the ring 92 is lifted. In this way the member 96 can overcome the weight of the plug 72 when the ring 92 is lifted.

In use, the ring 92 is removed from the stem 83 and the lid 79 is removed in order to expose the opening 64 in the top end 58 of the container 56. Thus, the lever 90 is lowered thereby facilitating the plug 72 to close the upper end of the funnel 66. In this way the container 56 can be filled with water without the water flowing out of the container 56 and into the base 12. The lid 79 is screwed onto the container 56 once the container 56 has been filled and the ring 92 is positioned around the stem 83. Thus, the lever 90 is lifted thereby facilitating the plug 72 to be lifted upwardly from the upper end of the funnel 66. In this way the water in the container 56 can flow through the funnel 66 and into the bowl section 14 of the base 12 thereby facilitating the animal to drink the water.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An automatic animal watering assembly being configured to be refilled from a top end, said assembly comprising:
    a base having a bowl section therein and a receiver section therein, said bowl section being in fluid communication with said receiver section;
    a heating unit being coupled to said base, said heating unit being in thermal communication with said bowl section such that said heating unit heats said bowl section when said heating unit is turned on wherein said heating unit is configured to heat water contained in said bowl section;
    a temperature sensor being coupled to said base such that said temperature senor is in thermal communication with said bowl section;
    a control unit being electrically coupled to said heating unit for turning said heating unit on and off, said control unit setting a maximum temperature for said heating unit, said control unit being electrically coupled to said temperature sensor such that said control unit senses the operational temperature of said heating unit, said control unit turning said heating unit off for a predetermined duration of time when said temperature sensor senses a temperature in excess of the maximum temperature;
    a container for containing water, said container being removably inserted into said receiver section of said base wherein said container is configured to release the water into said bowl section, said container has an opening extending into an interior of said container wherein said opening is configured to have water poured therethrough for filling said container;
    a plug being movably positioned within said container, said plug being positionable in a closed position having said plug being positioned in a bottom end of said container wherein said plug is configured to inhibit the water from passing through said bottom end, said plug being positionable in an open position having said plug being displaced from said bottom end wherein said plug is configured to facilitate the water to pass through said bottom end;
    a lid being removably coupled to said container; and
    a lever being pivotally coupled to said container, said lever extending into said container, said plug resting on said lever, said lever lifting said plug into said open position when said lever is lifted, said lever lowering said plug into said closed position when said lever is lowered, said lever being in mechanical communication with said lid.

2. The assembly according to claim 1, wherein:
    said base has a bottom wall and a top wall, each of said bowl section and said receiver section extending downwardly in said top wall toward said bottom wall; and
    said heating unit is integrated into said bottom wall of said base.

3. The assembly according to claim 2, further comprising a heating cord being electrically coupled to said heating unit and extending outwardly from said base, said heating cord having a distal end with respect to said base, said distal end having a male plug being electrically coupled thereto.

4. The assembly according to claim 3, further comprising a temperature cord being electrically coupled to said temperature sensor and extending outwardly from said base.

5. The assembly according to claim 4, wherein said control unit comprises a control circuit being positioned within said control unit, said control circuit receiving an off input.

6. The assembly according to claim 5, wherein said control unit comprises a heat port being coupled to said control unit, said heat port being electrically coupled to said control circuit, said male plug on said heating cord being electrically plugged into said heat port thereby placing said heating unit in electrical communication with said control circuit.

7. The assembly according to claim 6, wherein said control unit comprises:
    a down button being movably coupled to said control unit, said down button being electrically coupled to said control circuit, said down button decreasing the maximum temperature for said heating unit; and
    an up button being movably coupled to said control unit, said up button being electrically coupled to said control circuit, said up button increasing the maximum temperature for said heating unit.

8. The assembly according to claim 7, further comprising a display being coupled to said control unit, said display being electrically coupled to said control circuit, said display displaying indicia comprising numbers indicating the chosen maximum temperature.

9. The assembly according to claim 7, further comprising a power cord being coupled to and extending away from said control unit, said power cord being electrically coupled to said control circuit, said power cord having a distal end with respect to said control unit, said distal end of said power cord having a male power plug being electrically coupled thereto wherein said male power plug is configured to be electrically coupled to a power source comprising a female electrical outlet.

10. The assembly according to claim 2, wherein said container having a top end, a bottom end and an outer wall extending therebetween, said opening extending through said top end, said outer wall of said container tapering inwardly at said bottom end thereby defining a funnel that extends into said receiver section of said base, said outer wall of said container having an aperture extending into said interior of said container, said aperture being positioned on said funnel such that said aperture is positioned within said base wherein said aperture is configured to release the water into said base, said funnel having an upper end.

11. The assembly according to claim 10, wherein said plug has an upper end and a lower end, said plug being hollow, said upper end being open, said plug being fillable with a weighted material for facilitating said plug to be urged into said closed position, said lower end plugging said upper end of said funnel when said plug is positioned in said closed position.

12. The assembly according to claim 10, wherein said lid has a top surface and an inner surface, said top surface having a stem extending upwardly therefrom, said inner surface being threaded, said inner surface threadably engaging said outer wall of said container adjacent to said top end of said container.

13. The assembly according to claim 12, wherein said lever extends outwardly through said aperture in said outer wall of said container and into said bowl section of said base.

14. The assembly according to claim 13, further comprising a ring being positionable around said stem.

15. The assembly according to claim 14, further comprising a tube being coupled to said outer wall of said container, said tube being vertically oriented on said container, said tube being positioned to extend substantially between said lid and said lever.

16. The assembly according to claim 15, further comprising a member being coupled between said ring and said lever, said member extending through said tube.

17. An automatic animal watering assembly being configured to be refilled from a top end, said assembly comprising:
 a base having a bowl section therein and a receiver section therein, said bowl section being in fluid communication with said receiver section, said base having a bottom wall and a top wall, each of said bowl section and said receiver section extending downwardly in said top wall toward said bottom wall;
 a heating unit being coupled to said base, said heating unit being in thermal communication with said bowl section such that said heating unit heats said bowl section when said heating unit is turned on wherein said heating unit is configured to heat water contained in said bowl section, said heating unit being integrated into said bottom wall of said base;
 a heating cord being electrically coupled to said heating unit and extending outwardly from said base, said heating cord having a distal end with respect to said base, said distal end having a male plug being electrically coupled thereto;
 a temperature sensor being coupled to said base such that said temperature senor is in thermal communication with said bowl section;
 a temperature cord being electrically coupled to said temperature sensor and extending outwardly from said base;
 a control unit being electrically coupled to said heating unit for turning said heating unit on and off, said control unit setting a maximum temperature for said heating unit, said control unit being electrically coupled to said temperature sensor such that said control unit senses the operational temperature of said heating unit, said control unit turning said heating unit off for a predetermined duration of time when said temperature sensor senses a temperature in excess of the maximum temperature, said control unit comprising:
  a control circuit being positioned within said control unit, said control circuit receiving an off input;
  a heat port being coupled to said control unit, said heat port being electrically coupled to said control circuit, said male plug on said heating cord being electrically plugged into said heat port thereby placing said heating unit in electrical communication with said control circuit;
  a down button being movably coupled to said control unit, said down button being electrically coupled to said control circuit, said down button decreasing the maximum temperature for said heating unit;
  an up button being movably coupled to said control unit, said up button being electrically coupled to said control circuit, said up button increasing the maximum temperature for said heating unit;
  a display being coupled to said control unit, said display being electrically coupled to said control circuit, said display displaying indicia comprising numbers indicating the chosen maximum temperature; and
  a power cord being coupled to and extending away from said control unit, said power cord being electrically coupled to said control circuit, said power cord having a distal end with respect to said control unit, said distal end of said power cord having a male power plug being electrically coupled thereto wherein said male power plug is configured to be electrically coupled to a power source comprising a female electrical outlet;
 a container for containing water, said container being removably inserted into said receiver section of said base wherein said container is configured to release the water into said bowl section, said container having a top end, a bottom end and an outer wall extending therebetween, said top end having an opening extending into an interior of said container wherein said top end is configured to have water poured therethrough for filling said container, said outer wall tapering inwardly at said bottom end thereby defining a funnel that extends into said receiver section, said outer wall having an aperture extending into said interior of said container, said aperture being positioned on said funnel such that said aperture is positioned within said base wherein said aperture is configured to release the water into said base, said funnel having an upper end;
 a plug being movably positioned within said container, said plug being positionable in a closed position having said plug being positioned in said upper end of said funnel wherein said plug is configured to inhibit the water from passing through said funnel, said plug being positionable in an open position having said plug being displaced from said upper end of said funned wherein said plug is configured to facilitate the water to pass through said funnel, said plug having an upper end and a lower end, said plug being hollow, said upper end being open, said plug being fillable with a weighted material for facilitating said plug to be urged into said closed position;
 a cap being removably coupled to said upper end of said plug for closing said upper end of said plug;
 a lid being removably coupled to said container, said lid being positioned on said top end of said container, said lid closing said opening in said top end when said lid is closed, said lid exposing said opening in said top end when said lid is closed, said lid has a top surface and an inner surface, said top surface having a stem extending upwardly therefrom, said inner surface being threaded, said inner surface threadably engaging said outer wall of said container adjacent to said top end of said container;

a lever being pivotally coupled to said container, said lever extending into said container, said plug resting on said lever, said lever lifting said plug into said open position when said lever is lifted, said lever lowering said plug into said closed position when said lever is lowered, said lever being in mechanical communication with said lid, said lid lowering said lever when said lid is opened, said lid lifting said lever when said lid is closed, said lever extending outwardly through said aperture in said outer wall of said container and into said bowl section of said base;

a ring being positionable around said stem;

a tube being coupled to said outer wall of said container, said tube being vertically oriented on said container, said tube being positioned to extend substantially between said lid and said lever; and a member being coupled between said ring and said lever, said member extending through said tube.

\* \* \* \* \*